United States Patent [19]

Wilson et al.

[11] Patent Number: 5,569,443
[45] Date of Patent: Oct. 29, 1996

[54] METHOD FOR REMOVING HYDROGEN SULFIDE FROM A GAS USING POLYAMINO DISUCCINIC ACID

[75] Inventors: David A. Wilson, Richwood; Druce K. Crump, Lake Jackson, both of Tex.

[73] Assignee: The Dow Chemical Company, Midland, Mich.

[21] Appl. No.: 445,837

[22] Filed: May 22, 1995

Related U.S. Application Data

[62] Division of Ser. No. 342,391, Nov. 18, 1994.

[51] Int. Cl.[6] .................................................. B01D 53/52
[52] U.S. Cl. ........................ 423/576.6; 423/576.5; 423/576.7; 423/228
[58] Field of Search ........................... 423/576.5, 576.6, 423/576.7, 228, 573.1; 208/208 R

[56] References Cited

U.S. PATENT DOCUMENTS

| | | | |
|---|---|---|---|
| 3,119,709 | 1/1964 | Atkinson | 117/47 |
| 3,158,635 | 11/1964 | Kezerian et al. | 260/429 |
| 3,257,215 | 6/1966 | Schneble, Jr. et al. | 106/1 |
| 3,264,107 | 8/1966 | von Wartburg | 96/60 |
| 3,658,535 | 4/1972 | Willems | 96/59 |
| 3,893,858 | 7/1975 | Wabnitz, Jr. | 96/60 R |
| 3,933,993 | 1/1976 | Salemme | 423/573 |
| 3,937,795 | 2/1976 | Hasebe | 423/573 G |
| 4,011,304 | 3/1977 | Mancini et al. | 423/573 G |
| 4,047,956 | 9/1977 | Blake | 430/364 |
| 4,076,621 | 2/1978 | Hardison | 210/60 |
| 4,091,073 | 5/1978 | Winkler | 423/226 |
| 4,113,489 | 9/1978 | Sugiyama et al. | 96/60 R |
| 4,294,914 | 10/1981 | Fyson | 430/418 |
| 4,304,846 | 12/1981 | Marthaler et al. | 430/462 |
| 4,414,817 | 11/1983 | Jernigan | 60/641.2 |
| 4,532,118 | 7/1985 | Tajiri et al. | 423/226 |
| 4,563,405 | 1/1986 | Ishikawa et al. | 430/513 |
| 4,702,998 | 10/1987 | Tanaka et al. | 430/430 |
| 4,704,233 | 11/1987 | Hartman et al. | 252/527 |
| 4,707,434 | 11/1987 | Koboshi et al. | 430/393 |
| 4,737,450 | 4/1988 | Hall et al. | 430/460 |
| 4,769,312 | 9/1988 | Kishimoto et al. | 430/384 |
| 4,780,398 | 10/1988 | Kim | 430/461 |
| 4,897,339 | 1/1990 | Andoh et al. | 430/372 |
| 4,933,266 | 6/1990 | Stephen et al. | 430/393 |
| 4,983,315 | 1/1991 | Gologowski et al. | 252/102 |
| 4,985,347 | 1/1991 | Fujimoto et al. | 430/393 |
| 5,110,716 | 5/1992 | Kuse et al. | 430/429 |
| 5,238,791 | 8/1993 | Tappe et al. | 430/393 |
| 5,316,898 | 5/1994 | Ueda et al. | 430/400 |

FOREIGN PATENT DOCUMENTS

| | | |
|---|---|---|
| 0532003 | 3/1993 | European Pat. Off. . |
| 0567126A1 | 10/1993 | European Pat. Off. . |
| 0588289A2 | 3/1994 | European Pat. Off. . |
| 0584665A2 | 3/1994 | European Pat. Off. . |

OTHER PUBLICATIONS

"Oxidative Absorption of $H_2O$ and $O_2$ by Iron Chelate Solutions" by Neumann et al. A.I.CH.E. Journal vol. 30, No. 1 Jan. 1984, pp. 62–69.

Derwent Abstract 91–172208/24 (DE 3,939,756) Jun. 6, 1991; Wichmann et al.; Germany.

Derwent Abstract 84–145630/23 (SU 1,043,137) 23 Sep. 1983 Kostromina et al.; Soviet Union.

Derwent Abstract 89–288901 (JP 01–211,748) 24 Aug. 1989 (No Inventor Listed on Abstract); Japan.

Derwent Abstract 89–288902 (JP 01–211,750) 24 Aug. 1989 (No Inventor Listed on Abstract); Japan.

Derwent Abstract 89–290505 (JP 01–214,846) 29 Aug. 1989 (no inventor listed in Abstract); Japan.

Chemical Abstract 65:11738f to Chem. Zvesti 20(6) pp. 414–422 (1966, no month), Majer et al.

Chemical Abstract 102:138591z to Koord. Khim. (1985, no month) 11 (2), pp. 237–240 (Russian); Pal'chevskii et al.

Chemical Abstract 113:47510h to Teor. Eksp. Khim. (1990, no month) 26(2), pp. 196–201 (Russian); Gorokhovatskaya et al.

Chemical Abstract 98:117068t to Jpn. Kokai Tokkyo Koho Jp 57, 185, 435 15 Nov. 1982, 8 pages; Konishiroku Photo Industries.

J. Mejer et al., Chem. Zvesti 20(6) 414–22 (1966) (English translation) (no month).

*Primary Examiner*—Gary P. Straub
*Assistant Examiner*—Timothy C. Vanoy

[57] ABSTRACT

A process for gas conditioning, including a process of removing $H_2S$ from a gas, comprising contacting such gas with an aqueous solution under conditions for removing $H_2S$, wherein said solution contains at least one higher valence polyvalent metal chelate of a polyamino disuccinic acid, is disclosed.

8 Claims, No Drawings

METHOD FOR REMOVING HYDROGEN SULFIDE FROM A GAS USING POLYAMINO DISUCCINIC ACID

CROSS-REFERENCE TO RELATED APPLICATION

This is a divisional of application Ser. No. 08/342,391 filed Nov. 18, 1994.

This invention relates to chelants, particularly uses of certain degradable chelants.

Chelants or chelating agents are compounds which form coordinate covalent bonds with a metal ion to form chelates. Chelates are coordination compounds in which a central metal atom is bonded to two or more other atoms in at least one other molecule or ion (called ligand) such that at least one heterocyclic ring is formed with the metal atom as part of each ring.

Chelants are used in a variety of applications including food processing, soaps, detergents, cleaning products, personal care products, pharmaceuticals, pulp and paper processing, water treatment, metalworking and metal plating solutions, textile processing solutions, fertilizers, animal feeds, herbicides, rubber and polymer chemistry, photofinishing, and oil field chemistry. Some of these activities result in chelants entering the environment. For instance, agricultural uses or detergent uses may result in measurable quantities of the chelants being in water. It is, therefore, desirable that chelants degrade after use.

Biodegradability, that is susceptibility to degradation by microbes, is particularly useful because the microbes are generally naturally present in environments into which the chelants may be introduced. Commonly used chelants like EDTA (ethylenediamine tetraacetic acid) are biodegradable, but at rates somewhat slower and under conditions considered by some to be less than optimum. (See, Tiedje, "Microbial Degradation of Ethylenediaminetetraacetate in Soils and Sediments," Applied Microbiology, Aug. 1975, pp. 327–329.) It would be desirable to have a chelating agent which degrades faster than EDTA or other commonly used chelants.

While degradation of the chelant compounds themselves is an important factor in ascertaining their fate in the environment, it is also important to consider the form(s) in which the compound is likely to be found in a natural environment like a lake, river or soil. In contact with such environments, chelants can frequently be expected to be in the form of their chelates with metals present in the environment or metals acquired in use of the chelant. The specific metal chelated depends on the metals present, their relative concentrations and availability, and the relative affinity (e.g. as expressed by stability constants which can be calculated by comparing potentiometric pH measurement of the chelant in the absence of and in the presence of known concentrations of metal ion as described in *DETERMINATION AND USE OF STABILITY CONSTANTS* by Martell and Motekaitis, VCH Publishers, 1985, pp. 14 and 21–27.) of the chelant for each metal present. It is often important that the chelant degrade well in the form of its iron, copper, manganese or calcium complexes. It would be desirable for a chelant compound to degrade in the form(s) it is most likely to be found in the environment. This form is commonly the iron complex. (See, Laurent et al., IVL Report, "Effect of Complex Formers on the Aquatic Environment, NTA, EDTA and DTPA", Inst. Water and Air Conservation Research (IVL), Stockholm, Pub. B921, Dec. 1988.

Some chelants are at least somewhat Biodegradable, but have other disadvantages that reduce their suitability for applications that may result in their presence in water.

Polyamino disuccinic acids have been recognized as having some chelating properties but have not received wide usage. For instance, a better known member of the family, namely ethylenediamine disuccinic acid (EDDS), has not been widely used because it has less ability to chelate certain metal ions such as calcium and magnesium than more widely used chelants. The preparation of polyamino disuccinic acids is discussed by Kezerian et al. in U.S. Pat. No. 3,158,635 where their use in rust removal is disclosed. Atkinson in U.S. Pat. No. 4,704,233 disclose use of EDDS in detergents to enhance removal of organic stains and mention its biodegradability.

Biodegradation is of particular interest in photography, but finding a commercially useful biodegradable chelant has been difficult. Chelates are particularly useful in the photographic industry as iron complexes used as oxidizing agents, commonly referred to as bleaching agents, for removing silver halide images. However, the chelating agents that are most useful do not biodegrade in a desirable time (e.g. ethylenediaminetetraacetic acid, N-hydroxyethylethylenediaminetriacetic acid, diethylenetriaminepentaacetic acid, cyclohexanediaminetetraacetic acid, and propylenediaminetetraacetic acid all biodegrade less than 80% in 28 days using the semicontinuous activated sludge test.

Chelating ability is not indicative of redox ability of chelates of metal ions capable of more than one valence state. Nor can redox ability be predicted from structure as explained by R. Wichmann et al in "A New Bleaching Agent," presented at Imaging Science and Technology's 7th International Symposium on Photofinishing Technology, and published in R. Withmann et al. "Advance Printing of Paper Summaries; Seventh International Symposium on Photofinishing Technology," Las Vegas, Nev., Feb. 3–5, 1992 pp. 12–14.

It would be desirable to have a chelant useful in photographic processes and in other redox applications, particularly as a bleaching agent in photography, which chelant is greater than about 80 percent biodegradable within less than 28 days according to the semicontinuous activated sludge test (ASTM D-2667-82).

SUMMARY OF THE INVENTION

The ferric chelates of polyamino disuccinic acids such as EDDS have been found to be excellent oxidizing agents for use in photographic bleach, bleach-fixing solutions for the bleaching of photographic silver.

In one aspect the invention includes a method of bleaching or bleach-fixing a photographic material which comprises contacting said material with a bleaching solution containing a bleaching agent comprising a ferric complex of a polyamino disuccinic acid. Additionally, the invention includes an aqueous photographic bleaching solution comprising a water-soluble halide and as the bleaching agent a ferric complex of a polyamino disuccinic acid.

The invention also includes methods of electroless plating using various metals, especially copper. It includes a method of electroless deposition of copper upon a non-metallic surface receptive to the deposited copper including a step of contacting the non-metallic surface with an aqueous solution comprising a soluble copper salt and a polyamino disuccinic acid. Also included is a method of electroless copper plating which comprises immersing a receptive surface to be plated in an alkaline, autocatalytic copper bath comprising water, a water soluble copper salt, and a polyamino disuccinic acid complexing agent for cupric ion. Additionally, there is an improvement in a process for plating copper on non-metallic surfaces, only selected portions of which have been pretreated for the reception of electroless copper, by immersing the surface in an autocatalytic alkaline aqueous solution comprising, in proportions capable of effecting electroless deposition of copper, a water soluble copper salt, a complexing agent for cupric ion, and a reducing agent for cupric ion, the improvement comprising using as the complexing agent for cupric ion, a polyamino disuccinic acid. The invention includes a bath for the electroless plating of copper which comprises water, a water soluble copper salt, a polyamino disuccinic acid complexing agent for cupric ions, sufficient alkali metal hydroxide to result in a pH of from about 10 to about 14, and a reducing agent.

Another aspect of the invention includes a method for removing iron oxide deposits from a surface including a step of contacting the deposits with a solution comprising an ammoniated polyamino disuccinic acid.

Yet another aspect of the invention involves gas conditioning. In this aspect the invention includes a process of removing $H_2S$ from a fluid comprising contacting said fluid with an aqueous solution at a pH suitable for removing $H_2S$ wherein said solution contains at least one higher valence polyvalent metal chelate of a polyamino disuccinic acid. Another aspect of the gas conditioning invention includes a process of removing $NO_x$ from a fluid comprising contacting the fluid with an aqueous solution of at least one lower valence state polyvalent metal chelate of a polyamino disuccinic acid.

DETAILED DESCRIPTION OF THE INVENTION

Polyamino disuccinic acids are compounds having at least two amine groups to of at least two of which is attached an succinic acid (or salt) group, preferably only two nitrogen atoms each have one succinic acid (or salt) group attached thereto. The compound has at least 2 nitrogen atoms, and due to the commercial availability of the amine, preferably has no more than about 10 nitrogen atoms, more preferably no more than about 6, most preferably 2 nitrogen atoms. Preferably no more than about 4 nitrogen atoms, more preferably no more than about 3, most preferably 2 nitrogen atoms are substituted with succinic acid groups. Remaining nitrogen atoms most preferably are substituted with hydrogen atoms. More preferably, the succinic acid groups are on terminal nitrogen atoms, most preferably each of which nitrogens also has a hydrogen substituent. Because of steric hindrance of two succinic groups on one nitrogen, it is preferred that each nitrogen having a succinic group has only one such group. Remaining bonds on nitrogens having a succinic acid group are preferably filled by hydrogens or alkyl or alkylene groups (linear, branched or cyclic including cyclic structures joining more than one nitrogen atom or more than one bond of a single nitrogen atom, preferably linear) or such groups having ether or thioether linkages, all of preferably from 1 to about 10 carbon atoms, more preferably from 1 to about 6, most preferably from 1 to about 3 carbon atoms, but most preferably hydrogen. More preferably, the nitrogen atoms are linked by alkylene groups, preferably each of from about 2 to about 12 carbon atoms, more preferably from about 2 to about 10 carbon atoms, even more preferably from about 2 to about 8, most preferably from about 2 to about 6 carbon atoms. The polyamino disuccinic acid compound preferably has at least about 10 carbon atoms and preferably has at most about 50, more preferably at most about 40, most preferably at most about 30 carbon atoms. The term "succinic acid" is used herein for the acid and salts thereof; the salts include metal cation (e.g. potassium, sodium) and ammonium or amine salts. Polyamino disuccinic acids useful in the practice of the invention are unsubstituted (preferably) or inertly substituted, that is substituted with groups that do not undesirably interfere with the activity of the polyamino disuccinic acid in a selected application, particularly photographic uses. Such inert substitutents include alkyl groups (preferably of from 1 to about 6 carbon atoms); aryl groups including arylalkyl and alkylaryl groups (preferably of from 6 to about 12 carbon atoms), and the like with alkyl groups preferred among these and methyl and ethyl groups preferred among alkyl groups. Inert substituents are suitably on any portion of the molecule, preferably on carbon atoms, more preferably on alkylene groups, e.g. alkylene groups between nitrogen atoms or between carboxylic acid groups, most preferably on alkylene groups between nitrogen groups.

Preferred polyamino disuccinic acids include ethylenediamine N,N'-disuccinic acid, diethylenetriamine N,N''-disuccinic acid, triethylenetetraamine N,N'''-disuccinic acid, 1,6-hexamethylenediamine N,N'-disuccinic acid, tetraethylenepentamine N,N''-disuccinic acid, 2-hydroxypropylene-1,3-diamine N,N'-disuccinic acid, 1,2-propylenediamine N,N'-disuccinic acid, 1,3-propylenediamine N,N'-disuccinic acid, cis-cyclohexanediamine N,N'-disuccinic acid, trans-cyclohexanediamine N,N'-disuccinic acid, and ethylenebis(oxyethylenenitrilo)-N,N'-disuccinic acid.

Such polyamino disuccinic acids can be prepared, for instance, by the process disclosed by Kezerian et al. in U.S. Pat. No. 3,158,635 which is incorporated herein by reference in its entirety. Kezerian et al disclose reacting maleic anhydride (or ester or salt) with a polyamine corresponding to the desired polyamino disuccinic acid under alkaline conditions. The reaction yields a number of optical isomers, for example, the reaction of ethylenediamine with maleic anhydride yields a mixture of three optical isomers [R,R], [S,S] and [S,R] ethylenediamine disuccinic acid (EDDS) because there are two asymmetric carbon atoms in ethylenediamine disuccinic acid. These mixtures are used as mixtures or alternatively separated by means within the state of the art to obtain the desired isomer(s). Alternatively, [S,S] isomers are prepared by reaction of such acids as L-aspartic acid with such compounds as 1,2-dibromoethane as described by Neal and Rose, "Stereospecific Ligands and Their Complexes of Ethylenediaminedisuccinic Acid", *Inorganic Chemistry*, v. 7. (1968), pp. 2405–2412.

The invention includes use of iron complexes of polyamino disuccinic acids such as ethylenediamine disuccinic acid (EDDS), especially in photography. The ferric complexes are also useful in abatement of hydrogen sulfide and other acid gases and as a source of iron in plant nutrition. Similarly other metal complexes such as the copper, zinc and manganese complexes supply those trace metals in plant nutrition. The ferrous complexes are useful in nitrogen oxide abatement.

Iron complexes of polyamino disuccinic acid are conveniently formed by mixing an iron compound with an aqueous solution of the polyamino disuccinic acid (or salt). The pH of the resulting iron chelate solution is preferably adjusted with an alkaline material such as ammonia solution, sodium carbonate, or dilute caustic (NaOH). Water soluble iron compounds are conveniently used. Exemplary iron compounds include iron nitrate, iron sulfate, and iron chloride. The final pH of the iron chelate solution is preferably in the range of about 4 to 9, more preferably in the range of about 5 to 8. When an insoluble iron source is used, such as iron oxide, then the polyamino disuccinic acid is preferably heated with the iron oxide in an aqueous medium at an acidic pH. The use of an ammoniated polyamino disuccinic acid solution is particularly effective. Ammoniated polyamino disuccinic acid chelants are conveniently formed by combining ammonium or aqueous ammonia solutions and aqueous solutions or slurries of polyamino disuccinic acids in the acid (rather than salt) form.

Polyamino disuccinic acids are effective as chelants especially for metals such as iron and copper. Effectiveness as a chelant is conveniently measured by complexing the chelant with a metal such as copper such as by mixing an aqueous solution of known concentration of the chelant with an aqueous solution containing copper (II) ions of known concentration and measuring chelation capacity by titrating the chelant with copper in the presence of an indicator dye, using as an endpoint detector a photosensitive electrode.

Chelating capacity is not, however, a direct indicator of effectiveness in activities such as bleach fixing solutions for photography. For instance, N-methyliminodiacetic acid (MIDA) is a relatively poor chelating agent for ferric iron, requiring 2 to 3 moles of chelant to complex and solublize one mole of iron. The ferric complex of MIDA, however, is a strong bleaching agent.

Ethylenediamine disuccinic acid is biodegradable using a standardized test such as ASTM D-2667-82. In that test, a standardized sludge containing municipal waste treatment plant organisms is used to biodegrade the chelant in the presence of metal ions representative of those found in the environment including iron. Such a test simulates the environment encountered in a municipal waste treatment plant for screening the inherent biodegradability of non-volatile, water-soluble compounds. EDDS in this test was found to be greater than about 80 percent biodegradable in less than 28 days.

Polyamino disuccinic acids are preferably employed in the form of water-soluble salts, notably alkali metal salts, ammonium salts, or alkyl ammonium salts. The alkali metal salts can involve one or a mixture of alkali metal salts although the potassium or sodium salts, especially the partial or complete sodium salts of the acids are preferred because of their relatively low cost and enhanced effectiveness.

Polyamino disuccinic acids are particularly useful in photography, especially as a bleaching agent in bleach fixing solutions in the form of its iron (III) complex. The solutions are used to bleach a photographic material preferably having at least one silver halide layer or component.

Polyamino disuccinic acids used as bleaching agents which are components of the bleaching compositions and bleach-fixing compositions of this invention are preferably utilized in the form of water-soluble salts, such as ammonium or alkali metal salts, of a ferric polyamino disuccinic acid complex. Alternatively, the ferric complex of the present invention is used as free acid (hydrogen), alkali metal salt such as sodium salt, potassium salt, lithium salt, or ammonium salt, or a water soluble amine salt such as triethanolamine salt. Preferably, the potassium salt, sodium salt or ammonium salt is used. It is optional to use the ferric complex in combination with one more aminopolycarboxylic compounds.

The amount of polyamino disuccinic acid to be used depends on the amount of silver and the silver halide composition in the light-sensitive material to be processed.

It is preferred to employ about 0.01 mole or more, more preferably about 0.05 to about 1.0 mole, per liter of solution employed; preferably there is a molar ratio of polyamino disuccinic acid to ferric ion of from about 1:1 to about 5:1. In a supplemental solution, for supplying a smaller amount of more concentrated solution, the solution is conveniently employed at the maximum concentration permitted by the solubility of the polyamino disuccinic acid compound. The bleach compositions of this invention preferably contain about 5 to about 400 grams per liter of the polyamino disuccinic acid bleaching agent, more preferably about 10 to about 200 grams per liter.

The bleach-fixing solution of the present invention is preferably used in a pH range of about 2.0 to about 10.0, more preferably about 3.0 to about 9.5, most preferably about 4.0 to about 9.0. The temperature for processing is conveniently about 80° C. or lower, more desirably about 55° C. or lower, for the purpose of suppressing evaporation. The bleach-fixing processing time is preferably within about 8 minutes, more preferably with about 6 minutes.

The bleach or bleach-fix compositions optionally contain other additives within the skill in the art, such as amines, sulfites, mercaptotriazoles, alkali metal bromides, alkali metal iodides, thiols and the like. An additional silver halide solvent such as water-soluble thiocyanate or potassium thiocyanate is optionally included in the bleach-fix compositions. The bleach-fix composition optionally also contains a non-chelated salt of an aminopolycarboxylic acid, e.g., sodium salts of EDDS acid, in addition to the ferric salt.

As additives which can contribute to bleach-fixing characteristics, it is desirable to include alkali metal halides or ammonium halides, such as potassium bromide, sodium bromide, sodium chloride, ammonium bromide, ammonium iodide, sodium iodide, potassium iodide, and the like. Other optional additives include solublizing agents such as triethanolamine, and the like within the skill in the art for use in bleaching solutions such as acetylacetone, phosphonocarboxylic acid, polyphosphoric acid, organic phosphonic acid, oxycarboxylic acid, polycarboxylic acid, alkylamines, polyethyleneoxides, and the like. Use of special bleach-fixing solutions such as a bleach fixing solution comprising a composition in which a halide such as potassium bromide is added in a small amount, or alternatively a bleach-fixing solution in which a halide such as potassium bromide, ammonium bromide and/or ammonium iodide, or potassium iodide is added in a large amount, and, in addition, a bleach-fixing solution with a composition comprising a combination of the bleaching agent of the present invention and a large amount of a halide such as potassium bromide is within the scope of the invention.

Silver halide fixing agents suitable for incorporation in the bleach-fixing solutions of the present invention are preferably compounds within the skill in the art for fixing processing which can react with a silver halide to form a water soluble complex, and include thiosulfates such as potassium thiosulfate, sodium thiosulfate, ammonium thiosulfate, and the like; thiocyanates such as potassium thiocyanate, sodium thiocyanate, ammonium thiocyanate, thiourea, thioether; highly concentrated bromides, iodides, and the like. These fixing agents are conveniently used in amounts within the range which can be dissolved, namely 5 g/liter or more, preferably 50 g/liter or more, more preferably 70 g/liter or more; more preferably there are less than about 400, most preferably less than about 200 grams per liter.

The bleach-fixing solution of the present invention optionally also contains various pH buffers such as boric acid, borax, sodium hydroxide, potassium hydroxide, sodium carbonate, potassium carbonate, sodium bicarbonate, acetic acid, sodium acetate, ammonium hydroxide, and the like either singly or in a combination of two or more compounds. Optional ingredients include various fluorescent whitening agents, defoaming agents, antifungal agents, preservatives such as hydroxylamine, hydrazine, sulfites, metabisulfites, bisulfite adducts of aldehyde or ketone compounds, or other additives. Organic solvents such as methanol, dimethylformamide, dimethyl sulfoxide, and the like are optionally included. Addition of a polymer or a copolymer having a vinyl pyrrolidone nucleus as disclosed in Japanese Provisional Patent Publication No. 10303/1985 is also within the scope of the invention.

Other optional compounds in the bleach-fixing solution of the present invention for accelerating bleach-fixing characteristics, include tetramethylurea, phosphoric trisdimethylamide, ε-caprolactam, N-methylpyrrolidone, N-methylmorpholine, tetraethyleneglycol monophenyl ether, acetonitrile, glycol monomethyl ether, and the like.

In the photographic processing method of the present invention, it is preferred that the bleach-fixing step of the present invention is performed immediately after color developing, but optionally, alternatively, following processing such as water washing, rising or stopping, and the like, after color developing. Most preferably the bleach-fixing processing of the present invention is conducted, after pre-fixing processing after color developing.

Bleach-fixing processing is optionally followed by stabilizing the processing with or without washing with water before or after stabilizing processing. In addition to the listed steps, there are optionally various auxiliary steps such as steps of film hardening, neutralization, black-and-white developing, reversal, washings with a small amount of water, and the like, if desired. Typical examples of preferable processing methods may include the various steps as shown below:

(1) Color developing→Bleach-fixing→Water washing
(2) Color developing→Bleach-fixing→Washing with a small amount of water-→Water washing
(3) Color developing→Bleach-fixing→Water washing→Stabilizing
(4) Color developing→Bleach-fixing→Stabilizing
(5) Color developing→Bleach-fixing→First Stabilizing→Second Stabilizing
(6) Color developing→Water washing (or stabilizing)→Bleach-fixing→Water washing (or stabilizing)
(7) Color developing→Pre-fixing→Bleach-fixing→Water washing
(8) Color developing→Pre-fixing→Bleach-fixing→Stabilizing
(9) Color developing→Pre-fixing→Bleach-fixing→First stabilizing→Second stabilizing
(10) Color developing→Stopping→Bleach-fixing→Water washing→Stabilizing.

Of these processing steps, those of (3), (4), (5), (8) and (9) are preferably employed in the present invention, with processing steps of (4), (5), (8) and (9) most preferred.

In the bleach-fixing solution of the present invention, chelating agents and/or ferric complexes thereof outside the scope of the present invention are optionally added. However, it is preferred to use the ferric complex outside the scope of the present invention at a proportion of 0.45 mole percent or less relative to the organic acid ferric complexes of the present invention.

The reduced product of the iron complex formed in use of the bleach-fixing solution is optionally returned to the oxidized state, preferably by an oxidation treatment. Oxidation treatments include, for instance, introducing air or oxygen bubbles e.g. into the processing solution in the bleaching solution tank or the bleach-fixing solution tank, e.g., in an automatic developing machine, or by natural contact of the air on the liquid surface. For oxidation, effective contact of air or oxygen and solution is needed. Such contact is within the skill in the art and achieved by such means as stirring.

Polyamino disuccinic acids are also useful, for instance, in food products vulnerable to metal-catalyzed spoilage or discoloration; in cleaning products for removing metal ions, that may reduce the effectiveness, appearance, stability, rinsibility, bleaching effectiveness, germicidal effectiveness or other property of the cleaning agents; in personal care products like creams, lotions, deodorants and ointments to avoid metal-catalyzed oxidation and rancidity, turbidity, reduced shelf-life and the like; in pulp and paper processing to enhance or maintain bleaching effectiveness; in pipes, vessels, heat exchangers, evaporators, filters and the like to avoid or remove scaling, in pharmaceuticals; in metal working; in textile preparation, desizing, scouring, bleaching, dyeing and the like; in agriculture as in chelated micronutrients or herbicides; in polymerization or stabilization of polymers; in the oil field such as for drilling, production, recovery, hydrogen sulfide abatement and the like.

The chelants can be used in industrial processes whenever metal ions such as iron or copper are a nuisance and are to be prevented.

The polyamine disuccinic acids are also useful in processes for the electroless deposition of metals such as nickel and copper. Electroless plating is the controlled autocatalytic deposition of a continuous film of metal without the assistance of an external supply of electrons such as described in U.S. Pat. Nos. 3,119,709 (Atkinson) and 3,257,215 (Schneble et al.). Non-metallic surfaces are pretreated by means within the skill in the art to make them receptive or autocatalytic for deposition. All or selected portions of a surface are suitably pretreated. Complexing agents are used to chelate a metal being deposited and prevent the metal from being precipitated from solution (i.e. as the hydroxide and the like). Chelating a metal renders the metal available to the reducing agent which converts the metal ions to metallic form. Growth of electroless plating can be attributed in part to growth of the electronics industry, especially for printed circuits. Electroless plating solutions are complex and contain a variety of ingredients. For example, an illustrative electroless copper solution would advantageously contain copper salts, a reducing agent, a material for the adjustment of the pH, a complexing agent, a buffer, and various additives to control stability, film properties, deposition rates, and the like. Typical copper salts include the water soluble salts such as copper sulfate, chloride, nitrate and acetate. Other organic and inorganic salts of copper may also be used. Typical of the reducing agents that can be used in alkaline electroless copper plating baths are formaldehyde and formaldehyde precursors such as glyoxal and parafprmaldehyde. Borohydrides such as sodium or potassium borohydride and boranes such as amino boranes are also useful. In acidic copper solutions, hypophosphites such as sodium or potassium hypophosphite are used. On the acidic side, acids such as sulfuric may be employed. The pH adjustment is used to regulate the plating potential of the bath. A polyamino disuccinic acid is preferably used to chelate the copper. A typical aqueous bath utilizing the polyamino disuccinic acids advantageously contains from about 0,002 to about 0.60 moles of a water soluble copper salt, the polyamino disuccinic acid at a molar ratio of approximately 1 to 2 times that required to complex the copper, an alkali metal hydroxide in sufficient amounts to give a pH of from about 10 to about 14, and e.g. formaldehyde from about 0.03 to about 1.3 moles per liter. One particularly important need in the electroless metal plating baths are for chemicals of high purity. This can be extremely important since the surfaces being plated must be autocatalytically active. Many impurities poison the catalytic surface even when present in very small amounts. When this is the case, it is important that the chelating agents that are used be of high purity. Polyamino disuccinic acids that are especially effective and lend themselves to being easily purified by isolation as the water insoluble acid form include ethylenediamine disuccinic acid, diethylenetriamine disuccinic acid, and hexamethylenediamine disuccinic acid. Ethylenediamine disuccinic acid is a particularly preferred chelant. Used plating solutions, especially copper plating solutions, may be difficult to treat since they contain strong complexes such as EDTA (ethylenediaminetetraacetic acid) that are slowly biodegraded. The use of more biodegradable chelants such as EDDS are particularly useful in this regard.

In the polymerization of rubber polyamino disuccinic acids are suitably used for preparing e.g. the redox catalysts used therein. They additionally prevent the precipitation of such compounds as iron hydroxide in an alkaline polymerization medium.

In the textile industry, the chelants are suitably used for removing metal traces during the manufacture and dyeing of natural and synthetic fibers, thereby preventing many problems, such as dirt spots and stripes on the textile material, loss of luster, poor wettability, unlevelness and off-shade dyeings.

Exemplary of various other uses are applications in pharmaceuticals, cosmetics and foodstuffs where metal catalyzed oxidation of olefinic double bonds and hence rancidification of goods is prevented. The chelates are also useful as catalysts for organic syntheses (for example air oxidation of paraffins, hydroformylation of olefins to alcohols).

Metal chelates are important in agriculture because they supply micronutrients (trace metals such as iron, zinc, manganese, and copper) which are vital in the metabolism of both plants and animals. Plant problems previously ascribed to disease and drought are now recognized as possible symptoms of micronutrient deficiencies. Today these deficiencies are generally considered to be caused by (1) the trend toward higher analysis fertilizers containing fewer "impurities"; soils which had been adequately supplied with trace metals from these "impurities" have now become deficient (2) intensified cropping practices which place a severe demand on the soil to supply micronutrients; to maintain high yields, supplementary addition of trace metals is now necessary (3) high phosphorus fertilization, which tends to tie up metals in the soil in a form unavailable to the plant and (4) the leveling of marginal land for cultivation, which often exposes subsoils deficient in micronutrients. The metal chelates of aminocarboxylates such as EDTA and HEDTA are commonly used to chelate micronutrients for agricultural use. The iron, copper, zinc, and manganese chelates of the polyamino disuccinic acids such as EDDS can be used to deliver these metals to the plant. Because of the excellent solubility, these metal chelates are more readily utilized by the plant than are the inorganic forms of the metals. This is especially true in highly competitive ionic systems. As a result, the micronutrients that are chelated to, the polyamino disuccinic acids are more efficient than when compared to the inorganic sources. The iron chelates of iron, manganese, copper, and zinc with the biodegradable polyamino disuccinic acid EDDS are particularly preferred. Biodegradable chelants would have less residence time in soil.

Further fields of application for polyamino disuccinic acids include gas washing, conditioning or scrubbing (of e.g. flue, geothermal, sour, synthesis, process, fuel, or hydrocarbon gas) to remove at least one acidic gas, preferably the removal of $NO_x$ from flue gases, $H_2S$ oxidation and metal extraction. Polyvalent metal chelates of polyamino disuccinic acids are particularly useful in removing $H_2S$ from a fluid, particularly a gas, containing $H_2S$, by (directly or indirectly) contacting the fluid with at least one chelate of at least one, preferably one polyvalent metal in a higher valence state such that sulfur is formed along with the chelate of the metal in a lower valence state. The chelate of any oxidizing polyvalent metal capable of being reduced by reaction with $H_2S$ or hydrosulfide and/or sulfide ions and, preferably which can be regenerated by oxidation, is suitable. Preferably the chelates are water soluble. Exemplary metals include lead, mercury, nickel, chromium, cobalt, tungsten, tin, vanadium, titanium, tantalum, platinum, palladium, zirconium, molybdenum, preferably iron, copper, or manganese, most preferably iron.

Polyamino disuccinic acids are suitably used in any process of removal of $H_2S$ within the skill in the art such as those exemplified by U.S. Pat. Nos. 4,421,733; 4,614,644; 4,629,608 4,683,076; 4,696,802; 4,774,071; 4,816,238; and 4,830,838, which are incorporated by reference herein. The polyvalent metal chelates are readily formed in aqueous solution by reaction of an appropriate salt, oxide or hydroxide of the polyvalent metal and the chelating agent in the acid form or an alkali metal or ammonium salt thereof.

Preferably contact of $H_2S$, hydrosulfide, and/or sulfide with the chelate takes place at a pH of from about 6 to about 10. The more preferred range is from about 6.5 to about 9 and the most preferred range of pH is from about 7 to about 9. In general, operation at the highest portion of the range is preferred in order to operate at a high efficiency of hydrogen sulfide absorption. Since the hydrogen sulfide is an acid gas, there is a tendency for the hydrogen sulfide to lower the pH of the aqueous alkaline solution. Lower pH is preferable in the presence of carbon dioxide to reduce absorption thereof. Optimum pH also depends upon stability of a particular polyvalent metal chelate. At the pH values below about 6 the efficiency of hydrogen sulfide absorption is so low as to be generally impractical. At pH values greater than 10, for instance with iron as the polyvalent metal, the precipitation of insoluble iron hydroxide may occur resulting in decomposition of the iron chelate. Those skilled in the art can ascertain a preferred pH for each operating situation.

Buffering agents optionally useful as components of aqueous alkaline scrubbing solutions of the invention include those which are capable of maintaining the aqueous alkaline solution at a pH generally in a operating pH range of about 6 to about 10. The buffering agents are advantageously water soluble at the concentration in which they are effective. Examples of suitable buffering agents include the ammonium or alkali metal salts of carbonates, bicarbonates, or borates, including sodium carbonate, bicarbonate or sodium borate, particularly carbonates and bicarbonates when used in the presence of $CO_2$ (carbon dioxide).

The temperatures employed in a contacting or absorption-contact zone are not generally critical, except that the reaction is carried out below the melting point of sulfur. In many commercial applications, absorption at ambient temperatures is desired. In general, temperatures from about 10° C. to about 80° C. are suitable, and temperatures from about 20° C. to about 45° C. are preferred. Contact times conveniently range from about 1 second to about 270 seconds or longer, with contact times of 2 seconds to 120 seconds being preferred.

Suitable pressure conditions vary widely, depending on the pressure of the gas to be treated. For example, pressures in a contacting zone may vary from one atmosphere up to one hundred fifty or even two hundred atmospheres, with from one atmosphere to about one hundred atmospheres preferred.

In $H_2S$ removal, preferably at least an amount of chelate in a higher valence state stoichiometric with the $H_2S$ to be removed is used. Preferred mole ratios of chelate to $H_2S$ are from about 1:1 to about 15:1, more preferably from about 2:1 to about 5:1. When chelates in both higher and lower valence states are present, it is generally preferable to maintain a concentration of lower valence state chelate at least about 5 times the concentration of that in the higher valence state. When, for instance an iron chelate is used, it is preferably present in an amount from about 100 to about 100,000 ppm iron in the higher valence state most preferably from about 1000 to about 50,000 ppm by weight iron in the higher valence state. The circulation rate of the chelate solution depends upon the hydrogen sulfide level in the $H_2S$ containing fluid. In general, the circulation rate should be sufficient to provide from about 1 to about 6 moles and preferably about 2–4 moles of high valence (e.g. ferric) chelate for every mole of $H_2S$ entering the reaction zone. The contact time of the reactants should be at least about 0.05 second or more and preferably in the range from about 0.02 to about 1.0 seconds.

Polyamino disuccinic acids are preferably used in combination with additives such as rate enhancers (or catalysts, e.g. for conversion of $H_2S$ to sulfur) and/or stabilizers for the chelates. Cationic polymeric catalysts are advantageous and include polyethyleneamines, poly(2-hydroxypropyl-1-N-methylammonium chloride) and the 1,1-dimethyl analogue, poly[N-(dimethylaminomethyl) acrylamide], poly(2-vinylimidazolinum bisulfate), poly(diallyldimethyl ammonium chloride) and poly(N-dimethyl aminopropyl)-methacrylamide. These cationic polymers are well known and are commercially available under various tradenames. See, for example, *Commercial Organic Flocculants* by J. Vostrcil et al Noyes Data Corp. 1972 which is incorporated by reference herein. Other useful cationic catalysts are set forth in *J. Macromol. Science-Chem.* A4 pages 1327–1417 (1970) which is also incorporated by reference herein. Preferred catalysts include polyethylene amines and poly (diallyldimethyl ammonium chloride). Preferred concentration ranges for the polymeric catalysts are from about 0.75 to about 5.0 weight percent, and from about 1.0 to about 3.0 weight percent is the most preferred range. The amount of polymeric catalyst is sufficient to provide a weight ratio of iron or other polyvalent metal in the range from 0.2 to 10:1. Concentrations of from about 10 to about 25 ppm in solution are preferred. Stabilizing agents include, e.g. bisulfite ions such as sodium, potassium, lithium, ammonium bisulfite and mixtures thereof. They are used in stabilizing amounts, i.e. amounts sufficient to reduce or inhibit rate of degradation of the chelate, preferably from about 0.01 to about 0.6 equivalents per liter of solution, more preferably from about 0.05 to about 0.3 equivalents/liter.

After the chelate of lower valence state is produced from that of higher valence state, it is preferably oxidized back to the higher valence state and recycled. Oxidation is suitably by any means within the skill in the art, e.g. electrochemically, but preferably by contact with an oxygen-containing gas, e.g. air. If $CO_2$ is absorbed, it is preferably removed before contact with the oxygen-containing gas. The oxygen (in whatever form supplied) is advantageously supplied in a stoichiometric equivalent or excess with respect to the amount of lower valence state metal ion of the chelate or chelates present in the mixture. Preferably, the oxygen is supplied in an amount from about 1.2 to 3 fold excess and in a concentration of from about 1 percent to about 100 percent by volume, more preferably from about 5 percent to about 25 percent by volume. Temperatures and pressures are suitably varied widely, but generally those used in the contacting zone(s) are preferred, preferably temperatures of from about 10° C. to about 80° C. more preferable from about 20° C. to about 45° C. with pressures from about 0.5 atmosphere to about 3 or 4 atmospheres preferred. Mild oxidizing conditions are generally preferred to avoid degradation of chelating agent. Such conditions are within the skill in the art.

Sulfur produced by reaction of $H_2S$ with the polyvalent metal chelate is optionally solubilized, e.g. by oxidation. Oxidation is suitably by any means within the skill in the art. When $SO_2$ is present or easily generated by oxidation of $H_2S$ (e.g. using oxygen or electrochemical means) it is a preferred oxidizing agent to produce, e.g. thiosulfates from the sulfur. Other suitable oxidizing agents include e.g. alkali metal or ammonium salts of inorganic oxidizing acids such as perchloric, chloric, hypochlorous, and permanganic acids. Otherwise, the sulfur is optionally recovered by means within the skill in the art including flocculation, settling, centrifugation; filtration, flotation and the like.

Processes of the invention include, for instance: a process for removing at least a portion of $H_2S$ from a fluid stream containing $H_2S$ which comprises (A) contacting said fluid stream (optionally in a first reaction zone) with an aqueous solution at a pH range suitable for removing $H_2S$ wherein said solution comprises at least one higher valence polyvalent metal chelate of a polyamino disuccinic acid whereby said higher valence polyvalent metal chelate is reduced to a lower valence polyvalent metal chelate. Optionally the aqueous solution additionally comprises an oxidizing agent, capable of oxidizing elemental sulfur to soluble sulfur compounds, and/or one or more water soluble cationic polymeric catalysts and/or a stabilizing amount of a stabilizing agent each as bisulfite ion. The process optionally includes at least one additional step such as:

(B) contacting said solution containing the lower valence polyvalent chelate in a second reaction zone with an oxygen-containing gas stream whereby said chelate is reoxidized;

(C) recirculating said reoxidized solution back to said first reaction zone;

(D) feeding said aqueous solution from said oxidation zone to a sulfur recovery zone;

(E) removing from said aqueous solution at least a portion of said sulfur and thereafter;

(F) regenerating the aqueous admixture in a regeneration zone to produce a regenerated reactant;

(G) returning aqueous admixture containing regenerated reactant from the regeneration zone to the contacting zone;

(H) incinerating hydrogen sulfide to form sulfur dioxide;

(I) selectively absorbing said sulfur dioxide in an alkaline aqueous solution without substantial carbon dioxide absorption to form a solution of sulfites essentially free of insoluble carbonates;

(J) contacting said sulfur with said sulfites to form soluble sulfur compounds;

(K) recirculating said reoxidized polyvalent metal chelate back to said fluid stream/aqueous chelate solution contacting step; and/or (L) condensing geothermal steam in a reaction zone, preferably in said first reaction zone, for contacting said reduced polyvalent metal chelate.

Compositions of the invention, thus, include aqueous solutions of polyvalent metal chelates of the invention (in one or more oxidation states) with at least one of: $H_2S$, sulfide or bisulfide ions, rate enhancers such as poly(dimethyldiallyl ammonium chloride) and/or polyethyleneamines, and/or stabilizers such as bisulfite ions.

Similarly, polyamino disuccinic acids are used in removal of nitrogen oxides, preferably nitric oxide (NO), from fluids containing them. For instance, nitrogen oxides ($NO_X$) and $SO_2$ can be removed from flue gas streams by absorbing the $SO_2$ using an absorbent or reactant therefor, particularly an amine based absorbent such as a nitrogen-containing heterocyclic compound preferably having at least one carbonyl group such as a piperazinone; piperidinone, piperidine, piperazine or triazine having a carbonyl group; hydantoin; cyclic urea, oxazolidone or morpholinone in conjunction with a chelate of a polyvalent metal. Representative metal ions are chromium, cobalt, copper, iron, lead, manganese, mercury, molybdenum, nickel, palladium, platinum, tin, titanium, tungsten, and vanadium; preferably iron, copper, and/or nickel all preferably with a valence of +2, the more preferably iron, most preferably iron in the ferrous state. Such chelates are conveniently prepared by admixing a water soluble salt of the metal, such as a sulfate or acetate with a water soluble form of the chelating agent, e.g. a salt, advantageously in water. The chelates are useful in any process within the skill in the art such as those disclosed in U.S. Pat. Nos. 4,732,744 to Chang et al.; 4,612,175 to Harkness et al.; 4,708,854 to Grinstead; 4,615,780 to Walker; 4,126,529 to DeBerry; 4,820,391 to Walker; and 4,957,716 to Cichanowicz et al. When an $SO_2$ absorbent is used, it is preferably regenerated, more preferably thermally regenerated, and preferably recycled. The concentration of $NO_X$ in the fluid (directly or indirectly) contacting the chelate is preferably from about 1 ppm to about 15,000 ppm by volume such as is found, for instance, in flue gases from burning e.g. coal.

Whether used with an absorbent for $SO_2$ or not, the metal chelate is advantageously present in the solution which contacts the $NO_X$ containing fluid at a metal ion concentration greater than about-1 00 ppm with a chelating agent to metal ion molecular ratio of greater than or equal to one. The metal chelate is preferably present at a metal ion concentration of about 1,000 to about 10,000 ppm and a chelating agent to metal ion molecular ratio between about 1:1 and about 10:1. The optimum amounts depend on the chelating agent generally with preferred ratios between about 1:1 and to about 5:1.

An absorber is suitably operated at a temperature of from about 0° to about 120° C., but is preferably operated at a temperature of from about 5° to about 95° C. In the process, both absorber and (optionally) a stripper are typically operated at a pressure of from about atmospheric to about 10 atmospheres (e.g. 0 to about 69 Pa gauge), however, atmospheric pressure is preferred for the convenience of lower equipment and operating costs and reduced $SO_2$ absorbent losses. Higher temperatures and pressures are not deleterious so long as they are below the decomposition temperature of the chelate and absorbent, if present. The absorber is preferably maintained at a pH between about 3 and about 8 to retain $NO_X$ absorbence in the absorber.

Chelates absorb $NO_X$ or act as stoichiometric reactants to increase the solubility of $NO_X$ in aqueous solution. Preferably sulfite and/or bisulfite ions collectively referred to herein as "sulfites" are also present. Such ions react with the $NO_X$-chelate complex to form iminodisulfonate salts and free the chelate for $NO_X$ absorption. Examples of suitable soluble sulfite salts include sodium, potassium, lithium, magnesium and/or ammonium sulfite and/or bisulfite. When $SO_2$ is present, $SO_2$ in aqueous solution forms sulfurous acid, and the concentration of sulfites in the absorbent is generally sufficient for iminodisulfonate formation without replenishment, but sulfites may be added, if necessary, to maintain a concentration of at least 0.05 to about 1 g-moles/l absorbent, preferably at least about 0.1 g-moles/l. A sulfite salt is, thus, preferably present with the chelate.

Alternatively, as described in U.S. Pat. No. 4,957,716, which is incorporated herein by reference in its entirety, the chelate promotes absorption of $NO_X$ which may be converted to such compounds as $HNO_2$ and $HNO_3$ which react with $HSO_3$, if present, to form hydroxylamine-disulfonate ($HON(SO_3H)_2$, abbreviated HADS) and related compounds, which are preferably subsequently converted to soluble ammonium and sulfate ions advantageously at a pH of about 4.2 or less, preferably about 4. More preferably the ammonium ions are subsequently removed, e.g. by absorption, and most preferably, the sulfate ions are precipitated.

In removing $NO_X$ from a fluid, the polyvalent metal chelate is oxidized from a lower to a higher valence state. The lower valence metal chelate is preferably replenished, e.g. by replacement of the polyvalent metal ion of the chelate, but more preferably by reduction of the metal by any means within the skill in the art, such as by contact with a reducing agent, or preferably by electrochemical means (at a cathode). The chelate is, then, preferably recycled.

When electrochemical regeneration is used, the solution containing the higher valence polyvalent metal chelate (which solution is preferably first (advantageously thermally) stripped of $SO_2$) is preferably directed to a cathode compartment of an electrochemical cell comprised of an anode in an anode compartment separated, preferably by a membrane, from a cathode in a cathode compartment. An electrical potential is imposed across the anode and cathode to reduce inactive oxidized chelates to an active state. Preferably, an anionic exchange membrane is used. Heat stable amine salts may also be converted to free amine sorbent in the cathode compartment and soluble salt anions diffuse from the cathode compartment through the anion exchange membrane into the anode department. Preferably, in a further step, regenerated absorbent solution from the cathode compartment is recycled to the $NO_X$ containing fluid contacting step. The process more preferably additionally comprises a step of adjusting the pH of the regenerated recycle absorbent to from about 3 to about 8.

Compositions of the invention, thus, include aqueous solutions of the polyvalent metal polyamino disuccinic acids with at least one of $NO_X$, at least one (water soluble) sulfite, or at least one absorbent for $SO_2$. Mixtures of the chelates in higher and lower valence states and mixtures of the chelate with the chelate —$NO_X$ complex are also aspects of the instant invention.

Processes of the invention, thus, include a process for removing at least a portion of $NO_X$, preferably NO, from a fluid containing $NO_X$, said fluid preferably also containing $SO_2$ and said fluid preferably being a gas, but suitably being a liquid, suspension, condensate and the like comprising the step of (A) (directly or indirectly) contacting the fluid with an aqueous solution comprising at least one lower valence state polyvalent metal chelate of a polyamino disuccinic acid and optionally additionally containing an absorbent for $SO_2$ and/or a sulfite.

The process optionally additionally comprises at least one of the following steps:

(B) thermally stripping sulfur dioxide from an $SO_2$-rich absorbent solution to obtain an $SO_2$-lean absorbent solution;

(C) directing the absorbent solution to a cathode compartment in an electrochemical cell, said cell having an anode in an anode compartment separated (preferably by a membrane) from a cathode in said cathode compartment, and imposing an electrical potential across said anode and said cathode to reduce oxidized chelates in said cathode compartment to obtain a regenerated absorbent solution;

(D) recycling said regenerated absorbent solution to contacting step (A);

(E) converting heat stable amine salts into free amine absorbent in said cathode compartment;.

(F) separating salt anions from said cathode compartment through said anionic exchange membrane into said anode compartment;

(G) circulating an aqueous electrolyte solution through said anode compartment;

(H) periodically refreshing said electrolyte to eliminate byproduct salts in said anode compartment:

(I) adjusting said regenerated absorbent solution to a pH of from about 3 to about 8 for a recycling step;

(J) (when HADS is formed) mixing at least a portion of hydroxylaminedisulfonate in a reaction zone in an aqueous environment of pH of 4.2 or less, thereby converting said hydroxylaminedisulfonate to ammonium ions and sulfate ions in a second aqueous solution;

(K) contacting said second aqueous solution with a second ammonium ion-absorbing sorbent suitable for removing ammonium ions from said second aqueous solution and separating said second sorbent from said second aqueous solution;

(L) eluting said second sorbent and exposing the eluted ammonium ions or ammonia to nitrogen oxides at a temperature sufficient to form nitrogen and water therefrom; and/or (M) removing said sulfate ions from said second aqueous solution by forming a sulfate salt precipitate.

The following examples are offered to illustrate but not limit the invention. Percentages, ratios and parts are by weight unless stated otherwise. Examples of the invention (Ex.) are designated numerically, while comparative samples (C.S.), which are not examples of the invention, are designated alphabetically.

EXAMPLE 1

Preparation of Ethylenediaminedisuccinic Acid from Ethylenediamine and Maleic Acid and Preparation of the Ferric Chelate A sample, 120.5 grams, of maleic acid (1.03 mole—Fisher reagent grade) is added to a beaker. Deionized water (120 grams) and 167 grams of 50 percent NaOH (2.08 mole—Fisher reagent grade) are added, and the mixture is stirred until dissolution is observed. The resulting solution is transferred to a 1 liter stainless steel autoclave vessel using about 40 mL of deionized water as rinse. A sample, 31.03 grams, of ethylenediamine (0.51 mole—commercially available from The Dow Chemical Co.) is slowly added to the stirred (magnetic stirrer) sodium maleate solution over a 10 minute period. Then a cap is placed on the autoclave which is equipped with a thermowell and thermometer connected to a Therm-O-Watch™ temperature controller (commercially available from Instruments for Research & Industry (Cheltenham, Pa.)). Heat is supplied by a 30"×0.75" (76.2 cm × 1.9 cm) section of heating tape wrapped around the autoclave which is then insulated with glass wool. Stirring is achieved by a magnetically-driven 1.5" (3.8 cm) Teflon™ polytetrafluoroethylene coated stirrer bar. Temperature is maintained at 140° C. for about 9 hours, after which the mixture is allowed to cool to room temperature. The carbon NMR and proton NMR of the reaction mixture indicate essentially no remaining ethylenediamine and a very small amount of residual maleic acid. The reaction mixture is adjusted to a pH of approximately 2.0 with 36–37 percent hydrochloric acid (commercially available from Aldrich Chemical Co.). A powdery white precipitate develops which is filtered with Whatman #41 filter paper in a Buchner funnel. The precipitated solid is washed twice with 300 mL of deionized water. The resulting solids are dried overnight in a vacuum over at 60° C. Approximately 108 grams of product are obtained (74 percent yield of acid). The carbon NMR and proton NMR indicate essentially pure ethylenediaminedisuccinic acid.

Preparation of Ferric-Ethylenediaminedisuccinic Acid and Stability at Various pH's An approximately 0.01M iron (ferric)—ethylenediaminedisuccinic acid chelate solution is prepared by adding 1.63 grams of ethylenediaminedisuccinic acid and 200 mL of deionized water to a beaker. The slurry is stirred with a magnetic stirrer bar, and the pH is adjusted to 10.0 with 1.43 grams of 50 percent NaOH solution. A sample, 2.4 grams, of iron nitrate solution (11.75 percent iron), commercially available from Shepherd Chemical Company, are added with stirring. The pH of the solution, which drops to 1.7, is adjusted to 6.6 with aqueous ammonia (29 percent concentration) solution (commercially available from J. T. Baker Chemical Co.). The iron chelate solution is then diluted in a volumetric flask to a final volume of 500 mL. Fifty gram aliquots of the solution are then placed in four 2 oz. (0.059 l) bottles and the pH of each is adjusted to 7.0, 8.05, 9.1 and 10.0 respectively with a few drops of an aqueous ammonia solution. One 50 gram aliquot is adjusted to a pH of 6.0 with a few drops of dilute hydrochloric acid, and one 50 gram aliquot is adjusted to a pH of 10.5 with a 10 percent solution of sodium carbonate (8.5 g). The sample that is pH 10.5 develops an iron hydroxide precipitate almost immediately. The sample at pH 10.0 begins to form iron hydroxide after about 4 hours. The samples that are pH 6.0, 7.0, 8.05, and 9.1 do not develop any noticeable iron hydroxide. The samples are allowed to stand for 6 days at which time the "overheads" (that is liquids not containing visible solids) from each of the samples are analyzed for soluble iron by inductively coupled plasma spectroscopy. Results are given in Table 1.

TABLE 1

Fe(III) - EDDS vs pH

| pH | ppm* Fe in solution | percent Fe in solution |
| --- | --- | --- |
| 6.0 | 669 | 100 |
| 7.0 | 671 | 100 |
| 8.05 | 671 | 100 |
| 9.1 | 674 | 100 |
| 10.0 | 235 | 35 |
| 10.5 | 74 | 10 |

*parts per million by weight

This data shows that EDDS can complex iron and keep it in a soluble form (and thus available for reaction) at the pH values that are used for the applications described in the invention (that is, photographic bleaching agents, hydrogen sulfide abatement, and the like.)

EXAMPLE 2

Preparation of Diethylenetriamine N,N"-Disuccinic Acid and Stability at Various pH's Diethylenetriamine disuccinic acid is prepared and isolated by the procedure of Example 1 except that 51.5 g of diethylenetriamine are used in place of ethylenediamine and 116.1 g of maleic acid are used. Also, 160.0 g of 50 percent sodium hydroxide solution are used. The ability to complex iron at various pH values is determined in the same manner as was described for EDDS in Example 1 with the results in Table 2.

TABLE 2

| pH | ppm* Fe in solution | percent Fe in solution |
| --- | --- | --- |
| 5.9 | 531 | 99 |
| 7.0 | 526 | 98 |
| 8.0 | 535 | 100 |
| 9.2 | 527 | 99 |
| 10.0 | 531 | 99 |
| 10.5 | 166 | 31 |
| 11.0 | 22 | 4 |

*parts per million by weight

This data shows diethylenetriamine N,N"-disuccinic acid is an excellent chelating agent for iron and enables iron to remain soluble and available for reaction for the uses described in the invention.

EXAMPLE 3

Biodegradability Screening Via ASTM D2667 Semi-Continuous Activated Sludge Test

The procedure of ASTM D-2667-82 is used to determine the inherent biodegradability of EDDS.

Copper titration value is used to measure the extent of biodegradation of the chelating agents during the procedure. Titration is performed using ammonium purpurate (indicator for complexometric titration commercially available from Aldrich Chemical Co., Inc. under the trade designation Murexide) as the indicator at approximately pH 8, and using sodium acetate as buffer. Titration of EDDS in 100 mL water with 0.01 molar copper chloride resulted in a 1 (molar) chelation of copper. Analyses are performed daily for a period of 28 days.

Using the above procedure, EDDS was found to be greater than 80 percent biodegradable in less than 28 days.

A control is used to verify the absence of interfering chelating substances in the test.

These results of the biodegradability test show that EDDS is inherently biodegradable and could be expected to be utilized by organisms in a municipal treatment facility after an acceptable acclimation period.

EXAMPLE 4

And Comparative Samples A: Redox Potentials for EDDS and EDTA

The Reduction Potential of ferric complexes are measured using normal pulse polarography with a saturated calomel reference electrode. Polarographic data is obtained on a Bioanalytical Systems BAS-100a Voltammetric Analyzer interfaced to a Metrohm VA 663Multimode electrode stand according to the procedure described in Electrochemical Methods, Fundamentals and Applications by A. J. Bard and L. F. Faulkner, 1980, Wiley. Solutions are prepared of complexes of EDDS (Ex. 4) and EDTA (ethylenediaminetetraacetic acid) (as C.S. A), 0.001 molar in concentration in iron (III) [added as ferric perchlorate]and with a 10 mole percent excess of chelating agent. The solutions are 0.1 molar in $NaClO_4$, and adjusted to pH 5 with NaOH and/or $HClO_4$ as needed to reach the stated pH, diluted with the same electrolyte solution. Perchlorate electrolyte is used because perchlorate is 'non-coordinating', that is it can not interact with the ferric center and interfere in the experiment.

TABLE 3

| example/sample | chelate | reduction potential |
| --- | --- | --- |
| Ex. 4 | Fe(EDDS) | −126 mV |
| C.S. A* | Fe(EDTA) | −135 mV |

*not an example of the invention

The polarographic data shows that Fe(EDDS) gives a very good reversible reduction. The Fe(EDDS) is about 10 millivolts easier to reduce than the commercially used Fe(EDTA). This indicates that the Fe(EDDS) complex will oxidize silver in the photographic bleach process but is not sufficiently strong as an oxidizing agent to initiate bleach-fixer stability problems.

The data in Table 3 for EDDS represents an average of two slightly different potentials distinguishable at high resolution. Thus, there appears to be two solution species in the Fe(EDDS) which are close in potential. These probably represent different isomers of the complex since ethylenediaminedisuccinic acid has two asymmetric carbons as discussed earlier. The different isomers of the polyamino disuccinic acids and their metal complexes are within the scope of the invention.

EXAMPLE 5

$H_2S$ Abatement

A 2000 mL sample of 2 percent Fe (III) solution prepared from ethylenediamine disuccinic acid and iron nitrate (pH adjusted to-7 with aqueous ammonia) are placed in a four liter kettle equipped with a stirrer, thermometer, heating mantle, temperature controller, gas lines, caustic scrubber lines, pump, and sulfur filter, and allowed to equilibrate. The temperature is maintained at 120° C. A gas monitor is engaged and lead acetate tape placed around the flask joints and gas fittings. Air at approximately 500 standard cubic feet per minute (scfm) (14,160 liters per minute) is sparged into the bottom of the flask through a 7 μ stainless steel frit using ¼ (0.64 cm.) stainless steel tubing. Air sparging is done for about 30 minutes to assure there is little ferrous iron present. After the sparging is completed, 100 scfm (2832 liters per minute) of a mixture of $H_2S$ and $N_2$ gases are introduced for about 10 minutes to the reaction mixture through the 7 μ sparge frit. After the addition of gas mixture, some sulfur particles are noted forming on the surface of the reaction mixture. No breakthrough of the $H_2S$ gas is determined at the 10 ppm level by the monitor and no darkening of the lead acetate paper is observed. The gas is shut off and the sulfur filtered from the solution.

This data shows that the ferric chelate of ethylenediamine disuccinic acid is effective in the abatement of hydrogen sulfide.

EXAMPLE 6

Chelation of Copper with Polyamino Disuccinic Acids

Ethylenediamine disuccinic acid and diethylenetriamine disuccinic acid are titrated with standard 0.01M copper chloride solution. The titrations are performed using ammonium purpurate (indicator for complexometric titration commercially available from Aldrich Chemical Co., Inc. under the trade designation Murexide) at a pH of approximately 8 using sodium acetate as buffer. Both polyamino disuccinic acids complexed copper at a molar ratio of 1 mole of copper per mole of polyamino disuccinic acid.

EXAMPLE 7

Compilation of Copper in Alkaline Solutions

To be effective in an electroless copper plating bath, a chelating agent must maintain the copper is a soluble form in the pH range of about 10 to about 14. An especially preferred range is about 11 to 12.5. To determine the effectiveness of the polyamino disuccinic acids to prevent the precipitation of copper across this pH range a 0.05M copper chelate solution of ethylenediamine disuccinic acid is prepared from copper chloride, ethylenediamine disuccinic acid and sodium hydroxide. Approximately 70.0 gram portions are adjusted with sodium hydroxide solution to pH values of 10, 12, and 14. The ethylenediamine disuccinic acid is observed to maintain the copper in solution at these pH values preventing the precipitation of insoluble copper hydroxide. By comparison, a 0.05M copper solution prepared without the polyamino disuccinic acid ligand, used in the same manner at a pH of 10,12 and 14 results in precipitation of insoluble copper hydroxide from the solutions almost immediately. EXAMPLES 8 AND 9

Dissolution of Iron Oxide Scale

A sample, 10 gram, of ethylenediamine disuccinic acid (EDDS) is dissolved in deionized water, and sufficient aqueous ammonia solution is added to obtain a pH of 9.0. Deionized water is added to obtain a 5 weight percent EDDS solution. The resulting solution is heated at 100° C. for three hours with 0.2 grams of iron oxide ($Fe_3O_4$) and cooled to room temperature. The amount of soluble iron is then determined by inductively coupled plasma spectroscopy. After 3 hours, approximately 31 weight percent of the iron oxide is dissolved. (Example 8)

In a similar experiment an EDDS solution is adjusted to a pH of 4.5 with an aqueous ammonia solution. After three hours at reflux, approximately 70 weight percent of the iron oxide has dissolved. (Example 9)

This data shows that ammoniated polyamino disuccinic acids are effective in dissolving iron oxide scales.

EXAMPLE 10

Preparation of Zinc Chelate

The zinc chelate of ethylenediamine disuccinic acid is prepared by dissolving 0.0055 moles (1.64 g) of ethylenediamine disuccinic acid in 6.0 grams of deionized water and 3.2 grams of 25 percent NaOH (sodium hydroxide). A sample, 0.005 moles (0.68 g), of zinc chloride is added with stirring. The final pH is adjusted with 25 percent aqueous NaOH solution to a pH of 7.6 and deionized water is added to obtain a final solution containing 2.8 percent chelated zinc.

EXAMPLE 11

Preparation of Manganese Chelate

The manganese chelate of ethylenediamine disuccinic acid is prepared by dissolving 0.0055 moles of ethylenediamine disuccinic acid in 5.8 grams of deionized water and 2.6 grams of 25 percent NaOH solution. A sample, 0.005 moles, of $MnCl_2.4H_2O$ (1.0 g) is added with stirring. The pH is adjusted to 6.7 with 25 percent NaOH solution, and water is added to give a final solution containing 2.4 percent chelated manganese.

What is claimed is:

1. A process for removing $H_2S$ from a gas comprising contacting said gas with an aqueous solution having a pH from about 6 to about 10 to remove $H_2S$ wherein said solution contains at least one polyvalent metal chelate of a polyamino disuccinic acid.

2. The process of claim 1 wherein the metal is $Fe^{+3}$ and the polyamino disuccinic acid is EDDS.

3. The method of claim 1 wherein the polyamino disuccinic acid has at least two nitrogens to each of which is attached a succinic acid or salt group and said polyamino disuccinic acid has from 10 to about 50 carbon atoms which are unsubstituted or inertly substituted.

4. The method of claim 3 wherein the polyamino disuccinic acid has from 2 to about 6 nitrogen atoms, said nitrogen atoms being separated by alkylene groups of from 2 to about 12 carbon atoms each.

5. The method of claim 4 wherein the polyamino disuccinic acid has only two nitrogens to which succinic acid or salt groups are attached, which nitrogens are also bonded to at least one alkyl or alkylene group and have their remaining valence filled with hydrogen, alkyl or alkylene groups.

6. The method of claim 5 wherein the polyamino disuccinic acid has only two nitrogens.

7. The method of claim 6 wherein, in the polyamino disuccinic acid, the two nitrogens to which succinic acid or salt groups are attached are terminal.

8. The method of claim 1 wherein the polyamino disuccinic acid is selected from ethylenediamine-N,N'-disuccinic acid, diethylenetriamine-N,N''-disuccinic acid, triethylenetetraamine-N,N'''-disuccinic acid, tetraethylenepentamine-N,N''''-disuccinic acid, 1,2-propylenediamine-N,N'-disuccinic acid, 1,3-propylenediamine-N,N'-disuccinic acid, and combinations thereof.

\* \* \* \* \*